(12) United States Patent
Peterson et al.

(10) Patent No.: US 6,800,212 B2
(45) Date of Patent: Oct. 5, 2004

(54) FABRICATION OF OPTICAL COMPONENTS USING SI, SIGE, SIGEC, AND CHEMICAL ENDPOINT DETECTION

(75) Inventors: Jeffrey J. Peterson, Folsom, CA (US); Charles E. Hunt, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 253 days.

(21) Appl. No.: 10/146,278

(22) Filed: May 15, 2002

(65) Prior Publication Data

US 2003/0215968 A1 Nov. 20, 2003

(51) Int. Cl.[7] .............................................. B29D 11/00
(52) U.S. Cl. ...................................................... 216/24
(58) Field of Search ........................ 216/2, 24; 438/29, 438/31; 385/123, 124, 125, 126, 127, 128, 130, 131, 132

(56) References Cited

U.S. PATENT DOCUMENTS

| | | | | |
|---|---|---|---|---|
| 5,244,818 A | * | 9/1993 | Jokerst et al. ................ 438/25 |
| 5,387,269 A | * | 2/1995 | Nijander et al. .............. 65/386 |
| 5,465,860 A | * | 11/1995 | Fujimoto et al. ............. 216/24 |
| 5,471,552 A | | 11/1995 | Wuu et al. .................... 385/49 |
| 5,754,331 A | * | 5/1998 | Min ............................. 359/291 |
| 5,841,930 A | | 11/1998 | Kovacic et al. ............. 385/131 |
| 6,663,788 B2 | * | 12/2003 | Kowarz et al. ............... 216/24 |
| 2002/0020053 A1 | * | 2/2002 | Fonash et al. ............. 29/623.1 |
| 2002/0122648 A1 | * | 9/2002 | Mule' et al. ................ 385/129 |
| 2004/0061961 A1 | * | 4/2004 | Valette ....................... 359/872 |

* cited by examiner

Primary Examiner—Gregory Mills
Assistant Examiner—Roberts Culbert
(74) Attorney, Agent, or Firm—Park, Vaughan & Fleming LLP

(57) ABSTRACT

One embodiment of the present invention provides a system to facilitate using selective etching to form optical components on a circuit device. The system operates by receiving a substrate composed of a first material including a buffer layer composed of a second material. The system forms a sacrificial layer composed of a third material on the buffer layer. Next, the system forms an optical fiber core composed of a fourth material on the sacrificial layer. After the optical fiber core has been formed, the system performs an etching operation using a selective etchant to remove the sacrificial layer. The system also applies a cladding layer to the optical fiber core.

14 Claims, 7 Drawing Sheets

FABRICATION OF OPTICAL COMPONENTS USING SI, SIGE, SIGEC, AND CHEMICAL ENDPOINT DETECTION

RELATED APPLICATION

The subject matter of this application is related to the subject matter in co-pending non-provisional applications by the same inventors as the instant application entitled, "Method and Apparatus for Fabricating Structures Using Chemically-Selective Endpoint Detection," having Ser. No. 09/900,300, and filing date Jul. 5, 2001, "Fabricating Structures Using Chemo-Mechanical Polishing and Chemically-Selective Endpoint Detection," having Ser. No. 09/900,299, and filing date Jul. 5, 2001, and "Method of Fabricating Three-Dimensional Components Using Endpoint Detection," having Ser. No. 10/061,501, and filing date Jan. 31, 2002.

GOVERNMENT LICENSE RIGHTS

This invention was made with United States Government support under Grant Numbers N00014-93-C-0114 and N00014-96-C-0219, awarded by the Office of Naval Research. The United States Government has certain rights in the invention.

BACKGROUND

1. Field of the Invention

The present invention relates to a process for manufacturing structures on a substrate. More specifically, the present invention relates to creating optical components within an integrated circuit through a process that uses chemically-selective endpoint detection.

2. Related Art

The dramatic advances in computer system performance during the past 20 years can largely be attributed to improvements in the processes that are used to fabricate integrated circuits. By making use of the latest fabrication processes, integrated circuit designers can presently integrate computing systems comprised of hundreds of millions of transistors onto a single semiconductor die which is a fraction of the size of a human fingernail.

Integrated circuit fabrication technology is also being used to fabricate optical devices such as lasers within integrated circuit devices, and which have dimensions measured in fractions of microns.

A typical fabrication process builds structures through successive cycles of layer deposition and subtractive processing, such as etching. As the dimensions of individual circuit elements continue to decrease, it is becoming necessary to more tightly control the etching operation. For example, in a typical etching process, etching is performed for an amount of time that is estimated by taking into account the time to etch through a layer to reach an underlying layer, and the time to overetch into the underlying layer. However, this process can only be controlled to +/−100 Angstroms, which can be a problem when fine control of dimensions is required.

Furthermore, conventional etching processes that indiscriminately etch all exposed surfaces are not well suited to manufacture some structures that require tighter control over subtractive processing operations. As circuit structures become smaller, there is less tolerance available to account for uncertainties in the manufacturing process.

Additionally, connecting optical devices within an integrated circuit typically requires aligning optical fibers with an optical device such as a laser, or converting the optical signals to electrical signals at the source and converting the electrical signals back to optical signals at the destination. Aligning optical fibers with an optical device is difficult and time consuming because of the small dimensions involved, while converting the form of the signals can lead to signal degradation.

What is needed is a method of fabricating and connecting optical components that does not have the difficulties listed above.

SUMMARY

One embodiment of the present invention provides a system to facilitate using selective etching to form optical components on a circuit device. The system operates by receiving a substrate composed of a first material including a buffer layer composed of a second material. The system forms a sacrificial layer composed of a third material on the buffer layer. Next, the system forms an optical fiber core composed of a fourth material on the sacrificial layer. After the optical fiber core has been formed, the system performs an etching operation using a selective etchant to remove the sacrificial layer. The system also applies a cladding layer to the optical fiber core.

In one embodiment of the present invention, the system adds a filler to fill the cavity left by removing the sacrificial layer and planarizes the circuit device using chemo-mechanical polishing to create a planarized surface.

In one embodiment of the present invention, the substrate is Si and the buffer layer is SiGe or SiGeC. Using SiGeC for the buffer layer allows growth of a thicker buffer layer than when using SiGe. In this embodiment, the sacrificial layer is Si, the optical fiber core is $SiO_2$:$GeO_2$, the selective etchant used to remove the sacrificial layer is KOH or tetramethylammonium hydroxide (TMAH), and the cladding layer on the optical fiber core is $SiO_2$. It is appreciated that other materials and etchants may be used.

In one embodiment of the present invention, the buffer layer is SiGeC, wherein carbon is greater than or equal to one atomic percent.

In one embodiment of the present invention, the buffer layer is SiGeC, wherein carbon is less than or equal to one atomic percent.

In one embodiment of the present invention, the filler is $SiO_2$.

In one embodiment of the present invention, the buffer layer is an epitaxial layer.

In one embodiment of the present invention, the sacrificial layer is an epitaxial layer.

In one embodiment of the present invention, the optical fiber core is an epitaxial layer.

In one embodiment of the present invention, the system splits the optical fiber core into multiple optical fiber cores to form an optical multiplexer.

In one embodiment of the present invention, the system combines multiple optical fiber cores into a single optical fiber core to form an optical demultiplexer.

One embodiment of the present invention provides a system to facilitate integrating active or passive components on a circuit device that includes an optical fiber core that was epitaxially grown. During operation, the system receives this circuit device, and etches a cavity into the circuit device, wherein the cavity passes through the optical fiber core. The system also creates an active device within the cavity that is aligned with the optical fiber core.

In one embodiment of the present invention, etching the cavity includes etching into a buffer layer below the optical fiber core.

In one embodiment of the present invention, etching the cavity includes etching into a substrate layer below the optical fiber core.

In one embodiment of the present invention, the substrate layer includes a doped semiconductor region that can form part of the active device.

In one embodiment of the present invention, the system applies a metallization layer to the active device to form conduction paths for the active device.

In one embodiment of the present invention, the metallization layer forms a mirror metallization.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Creating a Circuit Device with an Optical Fiber Core

Figure 1A:
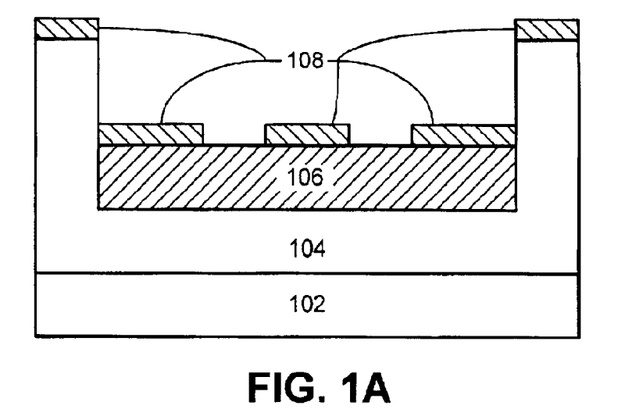
FIG. 1A illustrates preparing a circuit device with a sacrificial layer in accordance with an embodiment of the present invention.

FIG. 1A illustrates preparing a circuit device with a sacrificial layer in accordance with an embodiment of the present invention. The circuit device includes substrate 102, which can include the material Si. Note that the materials described herein include only one possible combination. A practitioner with ordinary skill in the art will be able to readily substitute other suitable materials for the ones described.

Buffer layer 104 is epitaxially grown on substrate 102. Buffer layer 104 can include SiGe or SiGeC. Using SiGeC allows the growth of thicker layers than does using SiGe. Note that using different materials for the various layers allows use of different chemical etchants to selectively etch the various layers.

Sacrificial layer 106 is epitaxially grown on buffer layer 104. Sacrificial layer 106 can include Si and is used to transfer the crystalline structure of buffer layer 104 to layers that are grown on sacrificial layer 106. Sacrificial layer 106 will be selectively etched away after forming these additional layers. Epitaxial blocking layer 1 08 has been added to the circuit device to control where additional layers will be grown on sacrificial layer 106. Epitaxial blocking layer 108 can include $SiO_2$ or SiN.

Figure 1B:
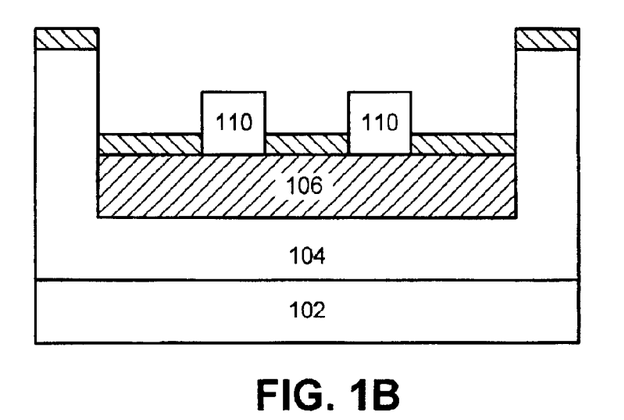
FIG. 1B illustrates forming optical fiber cores on the sacrificial layer in accordance with an embodiment of the present invention.

FIG. 1B illustrates forming optical fiber cores on the sacrificial layer in accordance with an embodiment of the present invention. Optical fiber cores 110 are epitaxially grown on sacrificial layer 106 and can include SiGe or $SiO_2$:$GeO_2$. Optical fiber cores 110 can include beams through the circuit device and can be routed through the circuit device as needed. Note that the material composition may be controlled during growth of optical fiber cores 110 to create a graded index optical fiber core.

Figure 1C:
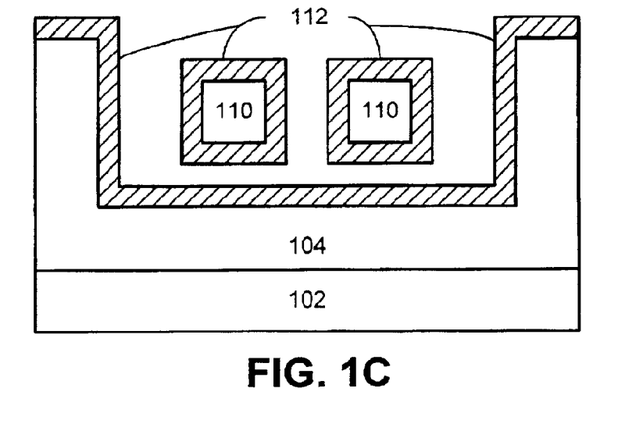
FIG. 1C illustrates removing the sacrificial layer and cladding the optical fiber core in accordance with an embodiment of the present invention.

FIG. 1C illustrates removing the sacrificial layer and the addition of cladding to the optical fiber core in accordance with an embodiment of the present invention. After growth of optical fiber cores 110, epitaxial blocking layer 108 is removed and sacrificial layer 106 is selectively etched using an etchant such as KOH or TMAH. Cladding layer 112 can then be added to optical fiber cores 110. A typical material for cladding layer 112 is $SiO_2$. Note that applying cladding layer 112 by thermal oxidation will tend to round optical fiber cores 110, thereby enhancing the graded index effect. Note also that SiGe and SiGeC can be selectively etched using hydrofluoriclnitric/acetic (HNA) acids.

Figure 1D:
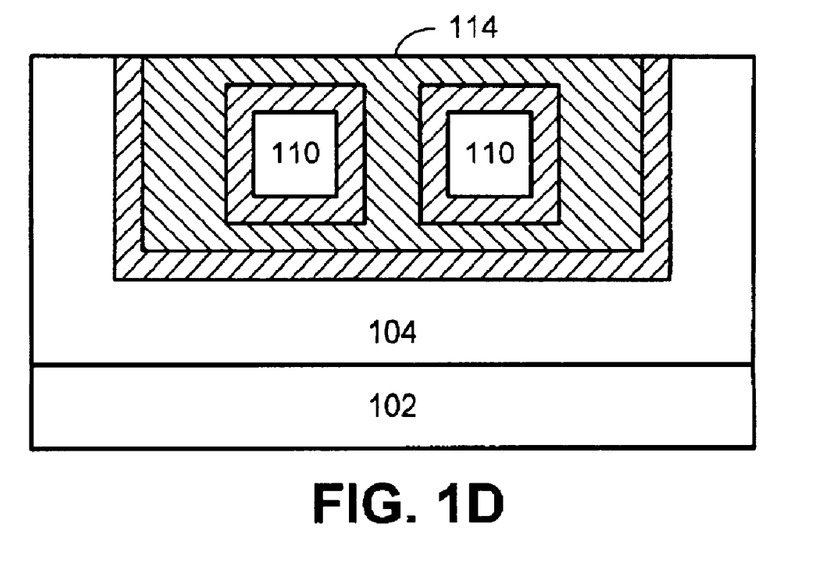
FIG. 1D illustrates including a filler in accordance with an embodiment of the present invention.

FIG. 1D illustrates including filler 114 in accordance with an embodiment of the present invention. Filler 114 can include any suitable material, gas, or liquid such as the same material, $SiO_2$, used for cladding layer 112. Note that filler 114 is optional and may be wholly or partially omitted.

Optical Multiplexers and Demultiplexers

Figure 2A:
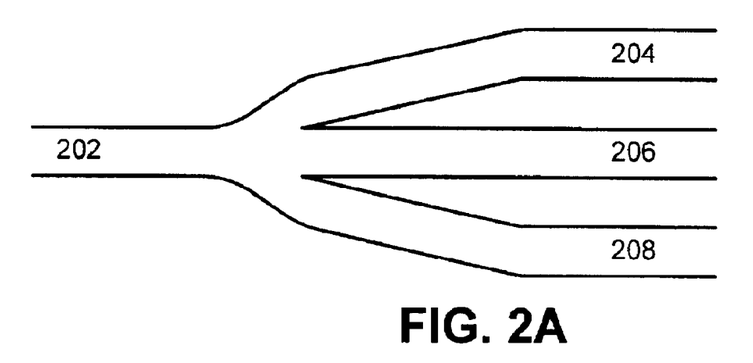
FIG. 2A illustrates an optical multiplexer in accordance with an embodiment of the present invention.

FIG. 2A illustrates an optical multiplexer in accordance with an embodiment of the present invention. Optical fiber core 202 is branched into optical fiber cores 204, 206, and 208. Note that optical fiber core 202 may branch into more or less optical fiber cores than shown. The optical multiplexer can be created by controlling the apertures in epitaxial blocking layer 108.

Figure 2B:
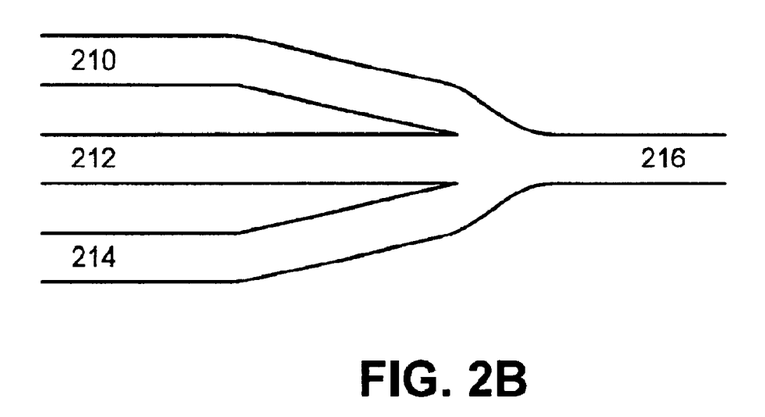
FIG. 2B illustrates an optical demultiplexer in accordance with an embodiment of the present invention.

FIG. 2B illustrates an optical demultiplexer in accordance with an embodiment of the present invention. Optical fiber cores 210, 212, and 214 are combined into optical fiber core 216. Note that optical fiber core 202 may combine more or less optical fiber cores than shown. The optical demultiplexer can be created by controlling the apertures in epitaxial blocking layer 108.

Forming Optical Fiber Cores

Figure 3:
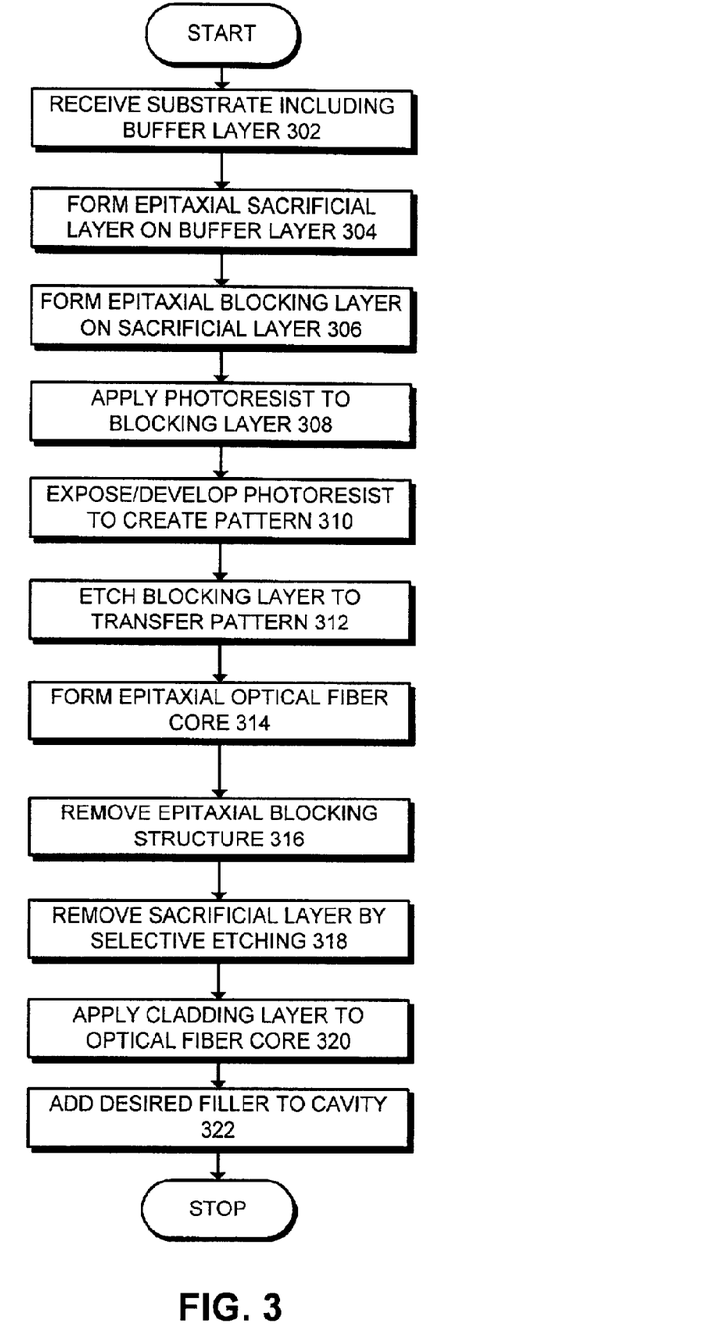
FIG. 3 is a flowchart illustrating the process of forming optical fiber cores on a circuit device in accordance with an embodiment of the present invention.

FIG. 3 is a flowchart illustrating the process of forming optical fiber cores on a circuit device in accordance with an embodiment of the present invention. The system starts by receiving substrate 102 including buffer layer 104 (step 302). Next, the system forms epitaxial sacrificial layer 106 on buffer layer 104 (step 304). Note that sacrificial layer 106 is used to transfer the crystalline template from buffer layer 104 to layers grown on sacrificial layer 106 such as optical fiber cores 110.

Epitaxial blocking layer 108 is then applied to sacrificial layer 106 (step 306). Next, photoresist is applied to epitaxial blocking layer 108 (step 308). After photoresist has been applied, the system exposes and develops the photoresist to create a pattern on the photoresist (step 310). Next, epitaxial blocking layer 108 is etched to transfer the pattern layer 108 (step 312).

Optical fiber cores 110 are then epitaxially grown on the exposed portions of sacrificial layer 106 (step 314). Next, epitaxial blocking layer 108 is removed (step 316). After epitaxial blocking layer 108 has been removed, sacrificial layer 106 is removed by selective etching (step 318).

Cladding layer 112 is then added to optical fiber cores 110 (step 320). Finally, filler 114 can be added to the cavity if desired (step 322).

Creating Active Devices

Figure 4A:
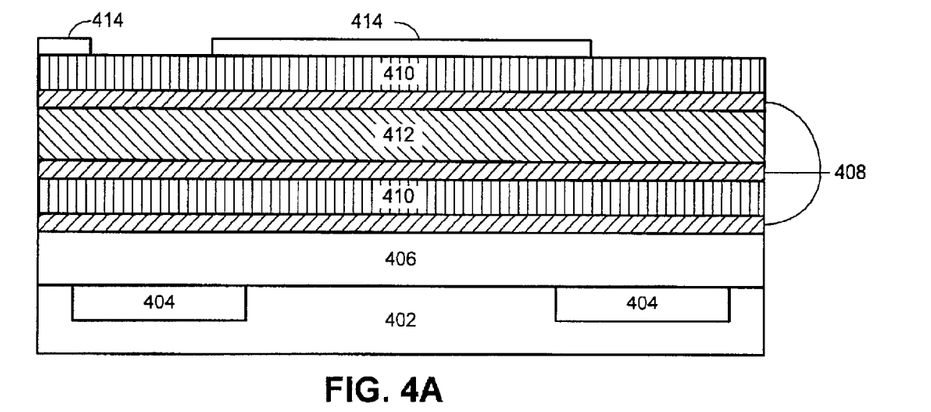
FIG. 4A illustrates a longitudinal cross-section view of a circuit device in accordance with an embodiment of the present invention.

FIG. 4A illustrates a longitudinal cross-section view of a circuit device in accordance with an embodiment of the present invention. The circuit device includes substrate 402, buffer layer 406, cladding layer 408, filler 410, and optical fiber core 412. The process described above in conjunction with FIGS. 1 through 3 can create these layers.

Substrate 402 can include regions 404. Regions 404 can be doped semiconductor regions such as N-type or P-type Si, or can be intrinsic Si. As previously noted, the materials described herein are exemplary and are not to be construed as the only possible materials for creating the various layers and structures. Photoresist 414 is applied, exposed, and developed to create windows for etching the structures.

Figure 4B:
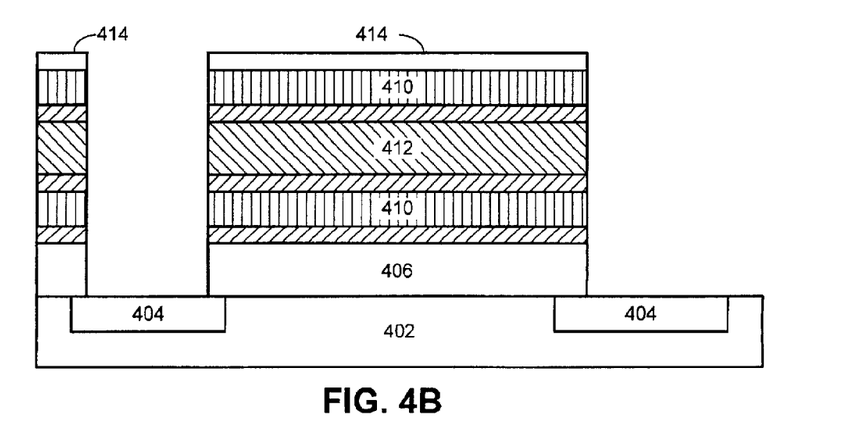
FIG. 4B illustrates cavities etched into the circuit device in accordance with an embodiment of the present invention.

FIG. 4B illustrates cavities etched into the circuit device in accordance with an embodiment of the present invention. Cavities have been etched into the circuit device using a combination of dry etching and wet etching, wherein wet etching has been used to selectively remove buffer layer 406 while not etching into regions 404 in substrate 402. Note that etching may be used to over-etch into regions 404 if desired. Note also, that etching may be stopped at buffer layer 406 or within buffer layer 406 if desired.

Figure 4C:
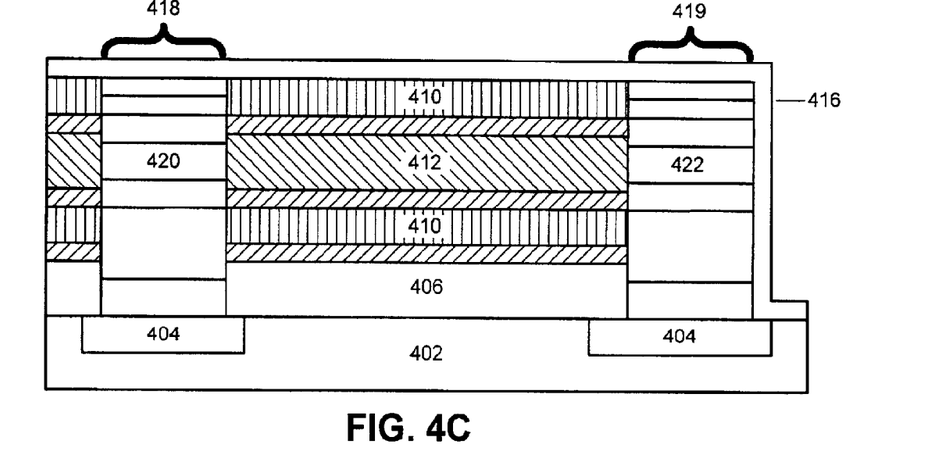
FIG. 4C illustrates active devices formed in the cavities in the circuit device in accordance with an embodiment of the present invention.

FIG. 4C illustrates active devices formed in the cavities in the circuit device in accordance with an embodiment of the present invention. Various active layers may be grown within the cavities to form active regions 418 and 419. Note that circuit layers 420 and 422 are aligned with optical fiber core 412. This allows coupling optical signals through optical fiber core 412 between circuit layers 420 and 422 without the need to couple the signals into an external optical fiber or converting the optical signal to an electrical signal and back to an optical signal. Photoresist 416 has been added for subsequent exposure and developing to create a pattern for metallization.

Figure 4D:
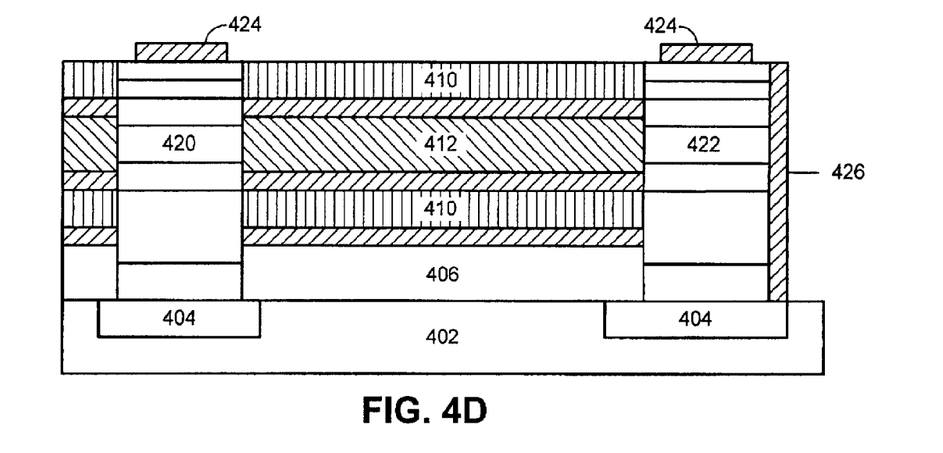
FIG. 4D illustrates metallization applied to the circuit device in accordance with an embodiment of the present invention.

FIG. 4D illustrates metallization applied to the circuit device in accordance with an embodiment of the present invention. Metallization 424 has been added to active regions 418 and 419 to allow electrical coupling of signals into and out of active regions 418 and 419. Mirror metallization 426 has been added to the circuit elements of active region 419. Other configurations are equally likely.

Forming Active Devices

Figure 5:
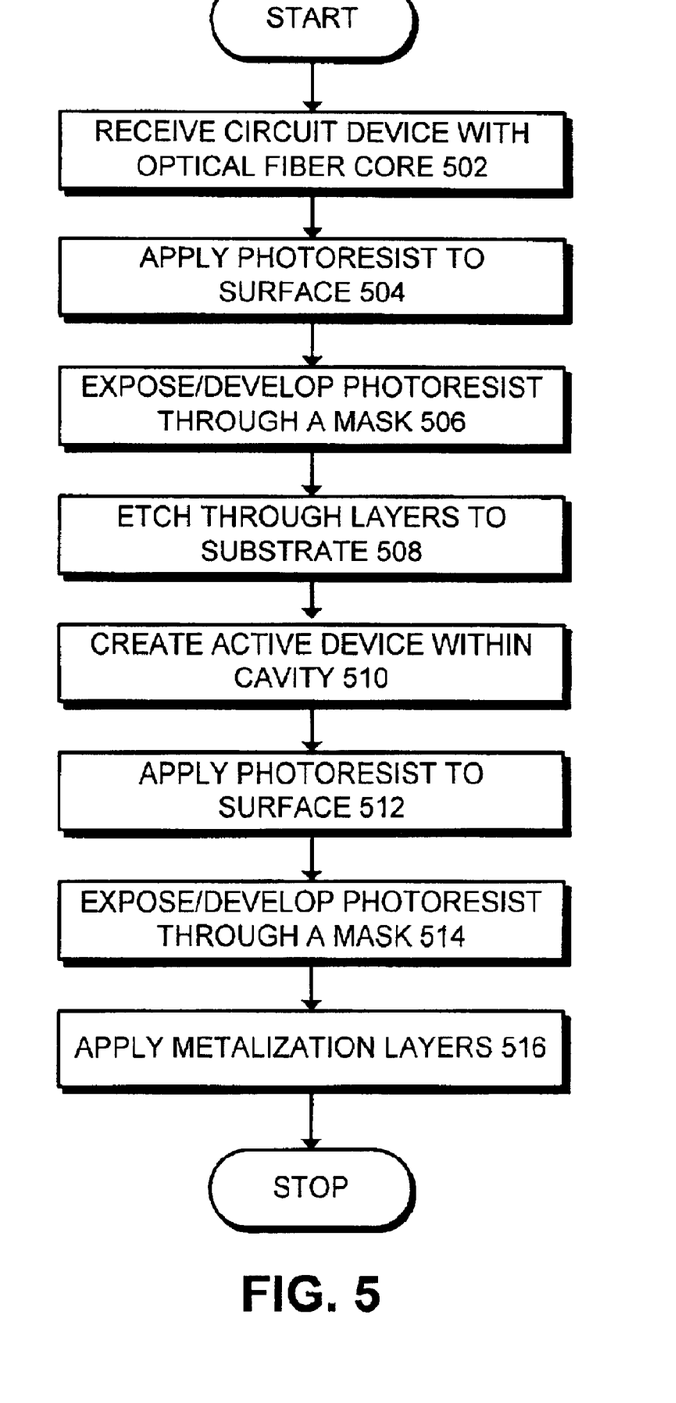
FIG. 5 is a flowchart illustrating the process of forming active devices in the circuit device in accordance with an embodiment of the present invention.

FIG. 5 is a flowchart illustrating the process of forming active devices in the circuit device in accordance with an embodiment of the present invention. The system starts by receiving the circuit device including optical fiber core 412 (step 502). This circuit device with optical fiber core 412 can be constructed as described above in conjunction with FIGS. 1 through 3.

Next, photoresist 414 is applied to the surface of the circuit device (step 504). Photoresist 414 is then exposed through a mask and developed to form a pattern on the circuit device (step 506).

Next, the various layers are etched to form cavities within the circuit device (step 508). Note that this etching can include a combination of dry etching and wet etching. The etching can be stopped within buffer layer 406, at regions 404, or can be over-etched into regions 404. Selective chemical etching can be used to automatically terminate etching at regions 404.

Active devices are then created within the cavities etched into the circuit device (step 510). These active devices can include active devices such as lasers, optical switches, etc., or passive devices such as lenses, mirrors, etc. Note that circuit layers 420 and 422 of the active devices are self-aligned with optical fiber core 412 eliminating the necessity of connecting an external optical fiber or converting the optical signal to an electrical signal to couple signals between circuit layers 420 and 422.

After forming the active devices in active regions 418 and 419, photoresist 416 is applied to the surface (step 512). Next a pattern is exposed and developed in photoresist 416 (step 514). Finally, metallization 424 and 426 is applied to the circuit device (step 516).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. It is appreciated that other active (e.g. moveable mirrors, etc.) and passive devices (e.g. lenses, micro-lenses, gratings, etc.) may be fabricated using the present invention. The scope of the present invention is defined by the appended claims.

What is claimed is:

1. A method for using selective etching to form optical components on a circuit device, comprising:

receiving a substrate composed of a first material including a buffer layer composed of a second material;

forming a sacrificial layer composed of a third material on the buffer layer;

forming an epitaxial blocking layer on the substrate, wherein the epitaxial blocking layer has windows exposing the sacrificial layer;

forming optical components composed of a fourth material on exposed portions of the sacrificial layer; and performing an etching operation using a selective etchant to remove the sacrificial layer;

wherein optical components include an optical fiber core; and wherein a cladding layer is applied to the optical fiber core.

2. The method of claim 1, wherein receiving the substrate includes receiving the substrate without the buffer layer.

3. The method of claim 1, further comprising adding a filler to fill at least a portion of a cavity left by removing the sacrificial layer.

4. The method of claim 3, wherein the first material comprises Si;

wherein the second material is SiGe or SiGeC, whereby SiGeC allows growing a thicker buffer layer than using SiGe;

wherein the third material comprises Si;

wherein the fourth material comprises $SiO_2:GeO_2$;

wherein the selective etchant is KOH or TMAH; and wherein the cladding layer comprises $SiO_2$.

5. The method of claim 4, wherein the second material comprises SiGeC, wherein carbon is greater than or equal to one atomic percent.

6. The method of claim 4, wherein the second material comprises SiGeC, wherein carbon is less than or equal to one atomic percent.

7. The method of claim 3, wherein the filler comprises $SiO_2$.

8. The method of claim 3, wherein the filler is a gas, a liquid, or a solid.

9. The method of claim 1, wherein the buffer layer is an epitaxial layer.

10. The method of claim 1, wherein the sacrificial layer is an epitaxial layer.

11. The method of claim 1, wherein the optical fiber core is an epitaxial layer.

12. The method of claim 1, further comprising splitting the optical fiber core into multiple optical fiber cores, wherein splitting the optical fiber core forms an optical multiplexer.

13. The method of claim 1, further comprising combining multiple optical fiber cores into a single optical fiber core, wherein combining multiple optical fiber cores forms an optical demultiplexer.

14. The method of claim 1, wherein forming the optical fiber core includes:

forming a graded index optical fiber core; and shaping the optical fiber core prior to applying the cladding layer, wherein shaping the optical fiber core includes rounding the optical fiber core.

* * * * *